United States Patent
Sugiyama et al.

(10) Patent No.: US 12,506,383 B2
(45) Date of Patent: Dec. 23, 2025

(54) ROTARY-DRIVEN POWER GENERATION DEVICE

(71) Applicants: Akira Sugiyama, Torrance, CA (US); Tasos Aggelopoulos, Torrance, CA (US)

(72) Inventors: Akira Sugiyama, Torrance, CA (US); Tasos Aggelopoulos, Torrance, CA (US)

( * ) Notice: Subject to any disclaimer, the term of this patent is extended or adjusted under 35 U.S.C. 154(b) by 0 days.

(21) Appl. No.: 18/844,187

(22) PCT Filed: Mar. 2, 2023

(86) PCT No.: PCT/JP2023/007735
§ 371 (c)(1),
(2) Date: Dec. 11, 2024

(87) PCT Pub. No.: WO2023/171517
PCT Pub. Date: Sep. 14, 2023

(65) Prior Publication Data
US 2025/0192643 A1    Jun. 12, 2025

(30) Foreign Application Priority Data

Mar. 7, 2022   (JP) .................................. 2022-034784

(51) Int. Cl.
| | | |
|---|---|---|
| H02K 7/02 | (2006.01) | |
| H02K 5/20 | (2006.01) | |
| H02K 9/06 | (2006.01) | |
| H02K 9/28 | (2006.01) | |
| H02K 21/10 | (2006.01) | |

(52) U.S. Cl.
CPC ............... *H02K 7/02* (2013.01); *H02K 5/207* (2021.01); *H02K 9/06* (2013.01); *H02K 9/28* (2013.01); *H02K 21/10* (2013.01)

(58) Field of Classification Search
CPC ............ H02K 5/207; H02K 7/02; H02K 9/06; H02K 9/28; H02K 21/10

(Continued)

(56) References Cited

U.S. PATENT DOCUMENTS 4,018,051 A * 4/1977 Gay .......................... F03D 1/04
60/407
7,342,342 B2 * 3/2008 Naitou ................. H02K 21/026
310/431

(Continued)

FOREIGN PATENT DOCUMENTS

| | | |
|---|---|---|
| JP | S61-196737 A | 8/1986 |
| JP | H09-322477 A | 12/1997 |

(Continued)

OTHER PUBLICATIONS

Decision to Grant a Patent issued in the corresponding Japanese Patent Application No. 2022-034784; dated Jun. 7, 2022 (total 5 pages).

(Continued)

*Primary Examiner* — Rashad H Johnson
(74) *Attorney, Agent, or Firm* — Harness, Dickey & Pierce, P.L.C.

(57) ABSTRACT

To rotate a rotary disk and revolve a plurality of power generators by a drive motor as a rotational drive source; to reduce the resistance to the power generators due to frictional rotation by rotational inertia of the rotary disk; and to cool a heated portion.

A rotary disk (7) is rotated together with a central rotational shaft (4) by a drive motor (1) as a rotational drive source; power generation motors (8) are attached as a plurality of power generators to one of the rotary disk (7) and a securing member (44,22), and an annular wheel-running track (11) is provided on the other; a wheel (10) on a power generation motor shaft (9) of each of the power generation motors (8) is brought into frictional rolling contact with the wheel-running track (11); and during an output process of electric power generated by revolution of each of the power generation motors (8) to a corresponding load or the like, the rotational inertia of the rotary disk (7) is used to stabilize the (Continued)

revolution of each of the power generation motors (8), thereby reduce power consumption of the drive motor (1).

22 Claims, 5 Drawing Sheets

(58) Field of Classification Search
USPC .......................................................... 310/74
See application file for complete search history.

(56) References Cited

U.S. PATENT DOCUMENTS

| | | | | |
|---|---|---|---|---|
| 2014/0203568 A1* | 7/2014 | Takenaka | ................ | F03G 7/107 74/DIG. 9 |
| 2023/0234396 A1* | 7/2023 | Tominaga | ........... | B60B 27/0052 |

FOREIGN PATENT DOCUMENTS

| | | |
|---|---|---|
| JP | 2003-523707 A | 8/2003 |
| JP | 2008-72784 A | 3/2008 |
| JP | 2013-123354 A | 6/2013 |

OTHER PUBLICATIONS

International Search Report issued in the corresponding International Application No. PCT/JP2023/007735; mailed on May 16, 2023 (total 5 pages).

Written Opinion of the International Searching Authority issued in the corresponding International Application No. PCT/JP2023/007735; mailed on May 16, 2023 (total 6 pages).

* cited by examiner

ROTARY-DRIVEN POWER GENERATION DEVICE

TECHNICAL FIELD

The present invention relates to a power generation device in which a plurality of power generators is revolved by a rotational drive source to generate multiple electric power. In particular, the present invention relates to improvements in effective means for reducing driving force and cooling a heated portion.

BACKGROUND ART

As a small to medium-sized power generator, not a large one, many power generators have been developed that have a basic configuration of a combination of a permanent magnet and a coil. It has been difficult to generate sufficient power by existing power generation devices because they could not effectively reduce the loss due to heat generation when electricity flows through the power generator and the loss due to frictional resistance in the rotation transmission means. Furthermore, with a power generator that uses a permanent magnet, heat generation tends to be ignored, resulting in poor power generation efficiency.

In addition, the rotational inertia of a flywheel has been used as a means for transmitting driving force from a rotational drive source to a power generator. For example, Patent Literatures 1, 2, and 3 disclose that a flywheel or the like is rotated together with a drive shaft by a starter motor in order to stably revolve a plurality of power generators by using its rotational inertia.

CITATION LIST

Patent Literature

[PTL 1] Japanese Unexamined Patent Application Publication No. 2013-123354
[PTL 2] Japanese Unexamined Patent Application Publication No. 2008-72784
[PTL 3] Japanese Unexamined Patent Application Publication No. S61-196737

SUMMARY OF INVENTION

Technical Problem

The aforementioned type of power generator usually requires a strong rotational force when starting a rotating part. However, once it reaches a steady rotation, it can continue to operate with even a smaller rotation force than at starting due to rotational inertia.

In light of the above, an object of the present invention is to rotate a rotary disk as a rotating part by a rotational drive source, to stably operate a plurality of power generators by rotational inertia of the rotary disk, and to reduce the resistance to the power generators due to frictional rotation when it reaches a steady rotation, thereby making it possible to effectively utilize the rotational motion of the rotary disk in the power generation process.

Solution to Problem

To solve the aforementioned problem, the present invention configures a rotary-driven power generation device (40) as a structure in which an elastically deformable rotary disk (7) is rotated (turned) by a drive motor (1) as a rotational drive source, and a plurality of power generation motors (8) are revolved by frictional rolling of wheels (10) on power generation motor shafts (9) of a plurality of power generation motors (8) and and a wheel-running track (11).

With the aforementioned rotary-driven power generation device (40): when starting the drive motor (1), rotational force required to start the power generation motors (8) is ensured by frictional contact between the wheel (10) and the wheel-running track (11); and during steady rotation after starting the drive motor (1), driving force of the drive motor (1) is reduced by rotational inertia of the rotary disk (7), and the rotary disk (7) is deformed into a dish shape by the centrifugal force acting on the center of gravity (36) of the rotary disk (7) in order to reduce pressing force between the wheel-running track (11) and the wheel (10), thereby reducing the load on the drive motor (1).

In addition, the present invention configures the rotary-driven power generation device (40) by: connecting the drive motor (1) as the rotational drive source to a vertical central rotational shaft (4); forming fan blades (42) on the rotary disk (7) attached orthogonal to the central rotational shaft (4); providing the annular wheel-running track (11) concentric with the central rotational shaft (4) on the outer periphery of the rotary disk (7); attaching a plurality of power generation motors (8) to a power-generation-motor-holding disk (44) as a fixed-side member at equal intervals relative to a center of the rotary disk (7) and are oriented in the radial direction; and bringing the wheel (10) fixed to a tip of the power generation motor shaft (9) into frictional contact with the wheel-running track (11).

The aforementioned rotary-driven power generation device (40) outputs multiple electric power efficiently and independently output from power generation motor output lines (28) of the respective power generation motors (8) while reducing the driving force of the drive motor (1) by the rotational inertia of the rotary disk (7) during rotation after starting the drive motor (1), and forcibly cooling heated portions by air blown from the fan blades (42) of the rotary disk (7).

Advantageous Effects of Invention

According to the present invention, the rotational force required to start the power generation motors (8) can be ensured by the frictional contact between the wheel (10) and the wheel-running track (11) when start-up, allowing for quick and reliable start-up. In addition, during the steady rotation after the start-up, the rotary disk (7) is deformed into a dish shape by the centrifugal force of the rotary disk (7) in order to reduce pressing force between the wheel (10) and the wheel-running track (11) so that frictional contact resistance, and thus the load on the drive motor (1) can be reduced, and electric power can be efficiently and independently output from the respective power generation motors (8) at the same time with less load.

Furthermore, according to the present invention, during the rotation of the drive motor (1) after start-up, it is not necessary to rotate the rotary disk (7) together with a plurality of power generation motors (8) by the high rotational torque of the drive motor (1), and the driving force of the drive motor (1) can be reduced by the rotational inertia of the rotary disk (7). Moreover, the heated portion is forcibly cooled by air from the fan blades (42) of the rotary disk (7) so that thermal loss is minimized, and electric power can be extracted without a unit of a slip ring and the brush.

BRIEF DESCRIPTION OF DRAWINGS

FIG. 2 is a bottom view of an attached state of a rotary disk (7) and a plurality of power generation motors (8) in the rotary-driven power generation device (40) of the present invention with.

DESCRIPTION OF EMBODIMENTS

Figure 1:
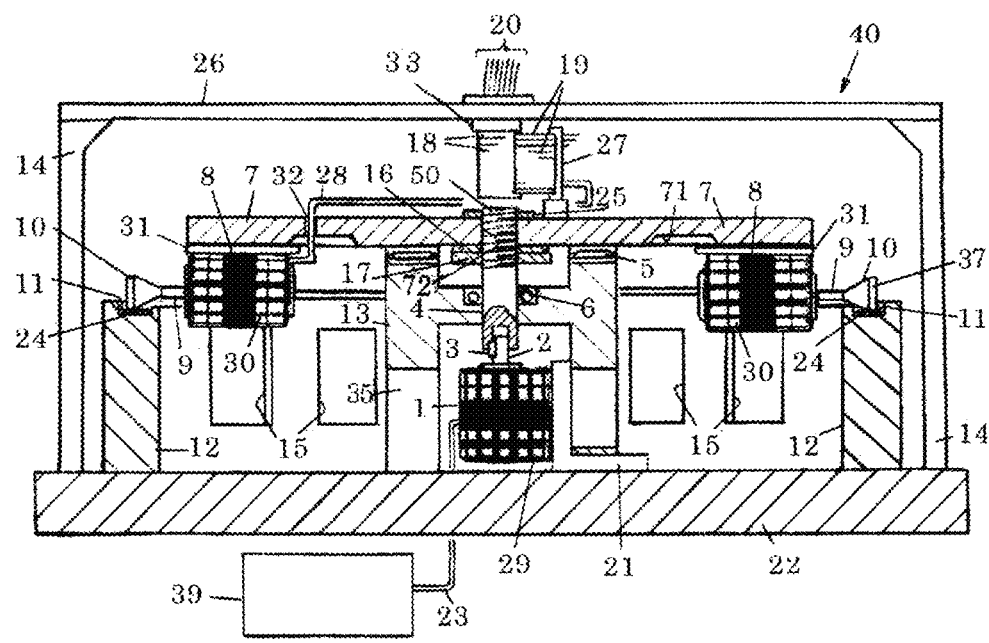
FIG. 1 is a vertical cross-sectional view of a rotary-driven power generation device (40) of the present invention.
Figure 2:
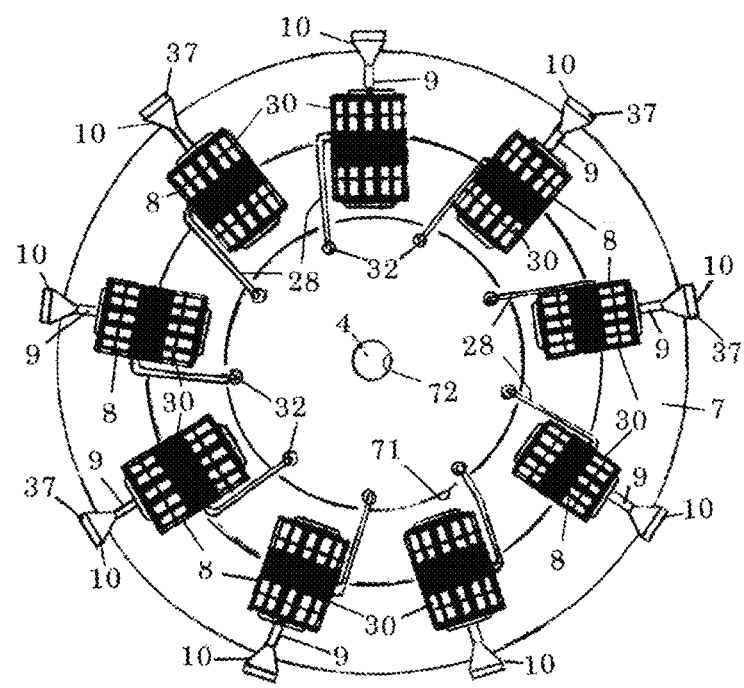

FIGS. 1 to 4 illustrates an example of the basic configuration of a rotary-driven power generation device 40 of the present invention. The rotary-driven power generation device 40 has a drive motor 1 as a rotational drive source with high torque and low rotation speed specification. In operation, the drive motor 1 rotates a rotary disk 7 as a rotating part together with a vertical central rotational shaft 4, thereby revolving a plurality of for example, nine power generation motors 8 as power generators attached on an outer periphery of a lower surface of the rotary disk 7 around a central rotational shaft 4.

The power generation motor 8 has a top-shaped (conical) wheel 10 fixed to the tip of the power generation motor shaft 9. Each of the power generation motors 8 independently generates electric power by bringing circumferential surface 37 of the outer periphery of the wheel 10 into frictional contact with a wheel-running track 11 of a cylindrical body 12 on a fixed side and rolling the power generation motor shaft 9 by frictional force while the rotary disk 7 is rotated (turned). In this way, a plurality of power generation motors 8 are attached to the rotary disk 7 on a rotating side and revolve together with the rotary disk 7.

Figure 4:
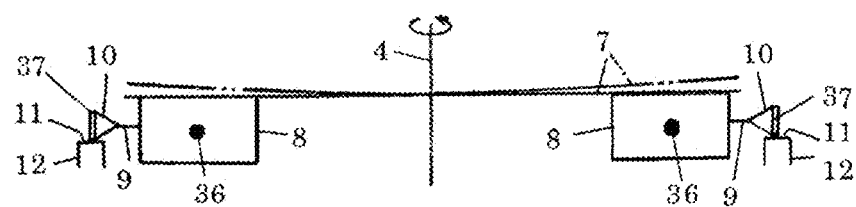
FIG. 4 is a schematic view of the rotary-driven power generation device (40) of the present invention when the rotary disk (7) is deformed into a dish shape.

The drive motor 1 includes a torque motor with high torque, a gear motor with a built-in reduction mechanism, and the like. A power source 39 of the drive motor 1 is commercial electricity, electricity obtained from conventional generators, or electricity of solar panels or charged in batteries, and is used solely to operate the drive motor 1 for the rotary-driven power generation device 40. The power generation motors 8 are attached by motor-holding plate 31 at an appropriate distance from the center of rotation below the rotary disk 7. To achieve this, the center of gravity 36 of the rotary disk 7 is set at a position lower than the lower surface of and near the outer periphery of the rotary disk 7 as shown in FIG. 4.

Note that the power generator is composed of a "DC or AC motor (electric motor)" in the illustrated configuration example and thus is described as a "power generation motor" in this specification. The power generation motor 8 has a permanent magnet and a coil as basic components in order to have a low-cost and simple structure, and other components built-in include a commutator for rectification, a slip ring, a brush, support parts for rotating parts, and the like depending on the model.

The drive motor 1 is fixed to the bottom plate 22 by an L-shaped drive motor holding plate 21 with a drive motor shaft 2 facing upward. The drive motor shaft 2 fits into a hole at the lower end of the central rotational shaft 4 and is connected to the central rotational shaft 4, so that rotation can be transmitted by a key 3. The central rotational shaft 4 is inserted into a mounting hole 72 of the rotary disk 7, is orthogonal to a plane of the rotary disk 7, and is integrated with the rotary disk 7 in a rotation-restricted state relative to a female screw 50 of the central rotational shaft 4 by fastening a lower nut 17 and an upper nut 25 with a coil-, annular-dish-, or annular-corrugated-shaped spring 16 interposed at the lower surface of the rotary disk 7. Note that, although not shown, a rotation restriction means between the central rotational shaft 4 and the rotary disk 7 is embodied by fitting a groove on the central rotational shaft 4 with an internal protrusion in the mounting hole 72, an embedded key therebetween, or the like.

The central rotational shaft 4 is rotatably held by a ball bearing 6 relative to a rotational-shaft-holding structure 13 fixed to the bottom plate 22, and the lower surface of the rotary disk 7 is rotatably supported together with nine power generation motors 8 by a thrust roller bearing 5 relative to the rotational-shaft-holding structure 13. Note that the rotational-shaft-holding structure 13 forms a window 35 for cooling and maintenance purposes as necessary.

As described above, the nine power generation motors 8 are mainly configured with a permanent magnet and a coil. They are attached to the lower surface of the rotary disk 7 together with the motor-holding plate 31 at intervals of equal central angles (40°) directed to the rotational center of the rotary disk 7 with the power generation motor shafts 9 being in the radial direction of the rotary disk 7, and housed in an internal space of the cylindrical body 12 so that they can rotate without interfering with other objects in it. The plane of the rotary disk 7 is orthogonal to the vertical central rotational shaft 4. The tip of each power generation motor shaft 9 is integrated with the top-shaped wheel 10 in a rotation-restricted state relative to the top-shaped wheel 10.

The top-shaped wheel 10 is fixed to the power generation motor shaft 9 by an embedded key, a push screw, or the like in a rotation-restricted state relative to the power generation motor shaft 9. Its large-diameter circumferential surface 37 frictionally contacts the wheel-running track 11 on an upper surface of the cylindrical body 12, and when the rotary disk 7 rotates, it rolls by frictional force based on pressing force between the wheel 10 and the wheel-running track 11, causing the power generation motor shaft 9 to rotate. The combination of the wheel-running track 11 and the circumferential surface 37 is a friction wheel with a large speed increase ratio. To increase the coefficient of friction, a friction material 24 such as a rubber sheet is attached to both or either of the wheel-running track 11 and the circumferential surface 37.

The pressing force (contact force) of the wheel 10 against the wheel-running track 11 can be increased or decreased by adjusting the weight of the power generation motors 8 or the degree of tightening of the spring 16. The rotary disk 7 is made of a material with elastic properties such as FRP, and as necessary, it has a deformed portion 71 formed of a thin annular sheet at approximately the middle position in the radial direction. The deformation portion 71 is formed to adjust appropriate elastic deformation properties for the rotary disk 7.

The drive motor 1 is connected to a power source 39 via a drive motor input line 23. Each of power generation motor output lines 28 is guided through a through hole 32 on the rotary disk 7 from one side to the other side of the rotary disk 7 and connected to a corresponding one of the multiple brushes 19 arranged in parallel. These brushes 19 are attached to the upper surface of the rotary disk 7 by brush supports 27 and are each electrically connected to an output line 20 via a slip ring 18. The slip rings 18 are fixed parallel, independently, and insulted on an outer circumferential surface of the cylindrical slip ring base 33 which is supported concentrically with the central rotational shaft 4, and the slip ring base 33 is attached to a lower surface of the slip ring support bar 26 supported by the slip ring post 14. In this example, the brushes 19 are attached to the rotary disk 7 on the rotating side, but if the slip ring 18 is attached to the rotary disk 7 on the rotating side, the brushes 19 are attached to the slip ring support bar 26 on the fixed side.

Figure 3:
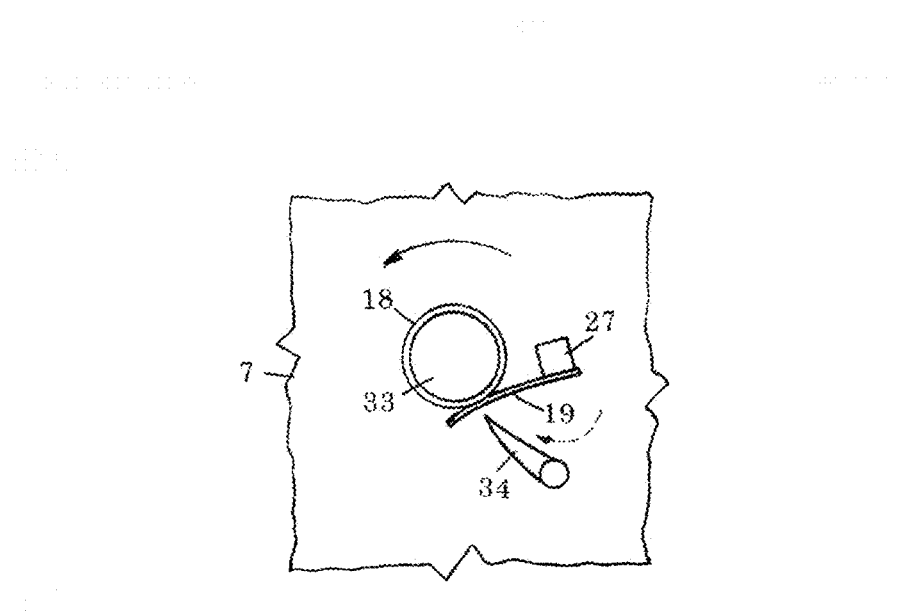
FIG. 3 is a plan view of a wind-collecting blade (34) for cooling a slip ring (18) and a brush (19) in the rotary-driven power generation device (40) of the present invention.

FIG. 3 shows a unit of the slip ring 18 and the brush 19, as well as an example of installation of a wind-collecting blade 34 as a part of this unit. The wind-collecting blade 34 extends toward the brush support 27, has a wing-shaped cross section, and disposed with the tip of the wing shape directed to a contact point between the slip ring 18 and the brush 19. When the rotary disk 7 rotates in the direction of the solid line in FIG. 3 and thus the power generation motors 8 revolve in the same direction, the wind-collecting blade 34 collects the swirling air as indicated by the dashed line in FIG. 3 and guide the air to the contact point between the slip ring 18 and the brush 19 in order to cool the frictional heat and heat due to continuity resistance at the contact point, thereby suppressing the loss associated with increased electrical resistance due to temperature rise.

Each of the drive motor 1 and the power generation motors 8 has a casing 29, 30 with a cooling window for heat dissipation, and furthermore, each of the cylindrical body 12 and the rotational-shaft-holding structure 13 has a window 15, 35 for heat dissipation and ventilation. These windows 15, 35 and the areas around the windows 15, 35 are cooled by the swirling air flow generated by the rotation of the rotary disk 7 and the revolution of the power generation motors 8, thereby suppressing heat generation due to an increase in electrical resistance in the portions through which current passes and reducing an electrical loss.

The rotation speed of the power generation motors 8 is determined by rotation speed of the wheel 10, and the rotation speed is determined according to the formula: overall length of the wheel-running track 11/length of the outer periphery of the circumferential surface 37 of the wheel 10. In the illustrated example, the length of the outer periphery of the circumferential surface 37 of the wheel 10 is shorter than the wheel-running track 11 so that one rotation of the drive motor 1 causes the power generation motor shaft 9 to rotate many times. Therefore, maximum power generation capacity can be obtained for each power generation motor 8 by increasing the rotation speed of the power generation motor shaft 9 to the speed at which the power generation is maximized with the rated speed of the power generation motors 8 as the upper limit. The diameter of the wheel 10, the diameter of the rotary disk 7, and the attaching position of the power generation motors 8 from the center of rotation are set according to the aforementioned formula on the basis of the rotation speed of the drive motor 1.

For example, if the rotation speed at which the power generation motors 8 can generate maximum power is 3000 [rpm], and the diameter of the rotary disk 7 is set to 400 [mm] and the diameter of the wheel 10 is set to 40 [mm], it is possible to transmit the rotation 10 times the rotation speed of the drive motor 1 to the power generation motor shaft 9. Calculating backwards from this formula, the drive motor 1 selects and attaches a motor with high torque characteristics capable of driving a plurality of power generation motors 8 and the rotary disk 7 at a low rotation speed of 300 [rpm]. Generally, an amount of electric power consumed by a low-speed motor has the characteristics lower than a high-speed motor. Since it is possible to transmit the rotation of the drive motor 1 to the power generation motor shaft 9 with increasing its speed, the rotary-driven power generation device 40 can be operated to continuously rotate at a low speed. Therefore, the power consumption required to operate (rotate) the drive motor 1 is reduced, and the overall power generation efficiency is improved.

When a user connects the power source 39 to a pair of drive motor input lines 23 for supplying electrical power to the drive motor 1 for operating the rotary-driven power generation device 40, the drive motor 1 starts up to rotate the rotary disk 7 together with the central rotational shaft 4 with the rotation force required for the initial stage of the start-up, transitions to steady rotation after a predetermined start-up period, and then continues stable rotation at the target rotation speed. The rotation of the rotary disk 7 is transmitted to a plurality of power generation motors 8 by frictional contact between the wheel 10 and the wheel-running track 11 caused by the pressing force therebetween.

During the low-speed rotation of the drive motor 1 at the initial stage of the start-up, strong centrifugal force is not generated in the rotary disk 7 and a plurality of power generation motors 8, so that the weight of a plurality of power generation motors 8 acts on the wheel 10, and due to the contact between the wheel 10 and the wheel-running track 11 caused by the pressing force, a frictional force (contact force) between the two that is necessary for the initial rotation (start-up). As a result, the wheel 10 obtains frictional rotational force and runs along the wheel-running track 11 so that all the power generation motors 8 are driven by the power generation motor shafts 9, transition to steady rotation after start-up, and start generating electric power independently. In this way, each of the power generation motors 8 obtains frictional force required for rotation between the wheel 10 and the wheel-running track 11 at the initial stage of the start-up, and then reliably starts generating electric power from the moment of start-up without slipping.

When the drive motor 1 transitions to steady rotation, rotational inertia of the rotary disk 7 and the power generation motors 8 causes a flywheel effect, so that the electric power required to continue the rotation of the drive motor 1 can be reduced compared to the initial period of the start-up. Moreover, as shown in FIG. 4, since the center of gravity 36 of the rotary disk 7 is lower than the attaching position of the power generation motors 8 (the lower surface of the rotary disk 7) during the steady rotation, the centrifugal force acting on the position of the center of gravity 36 deforms the outer periphery portion of the rotary disk 7 with a rising-up tendency as the two-dot chain line in FIG. 4, that is, a separating tendency of the wheels 10 from the wheel-running track 11, thereby reducing the pressing force of the wheel 10 against the wheel-running track 11 within the range that does not cause slipping phenomenon. Therefore, when transitioning steady rotation, due to the flywheel effect caused by rotational inertia of the rotary disk 7 and the power generation motors 8 as well as the action of the centrifugal force, the load on the drive motor 1 is reduced by decreasing the pressing force within the range that does not cause slipping phenomenon.

In operation, a plurality of power generation motors 8 continue to generate electric power. The current of each of the power generation motors 8 is supplied to the corresponding brush 19 via the power generation motor output lines 28 and is finally supplied to each load from the output lines 20 due to electrical brushing contact between the brush 19 and the slip ring 18. In this way, the electric power generated by the rotary-driven power generation device 40 is obtained independently for each of the power generation motors 8 and is supplied to the loads individually or with being added to each other.

Since the output electric power from the power generation motor 8 is generated with a conversion loss from the electronic power used by the drive motor 1, the model and the number of units to be installed of the power generation motor 8 are determined taking into account the loss ratio in order to achieve the target output. Since there is no electrical connection between the drive motor 1 and the power generation motors 8, the target output can be easily obtained by taking into consideration the torque required to drive mechanical rotating parts and the characteristics of the mechanical rotating parts. For example, when the loss ratio is 13 [%] and the target output is electric power of 100 [V] and 4 [KW], a power generation motor 8 with specifications of 115 [V] and 4.6 [KW] can be used. In this case, it's exactly equivalent to the standard US motor specification.

During the power generation process as described above, the temperature of each part rises due to heat generated by the current passing through the drive motor 1 and the power generation motors 8, as well as frictional heat from the rotating parts. However, the heat is effectively cooled by the air flow caused by the rotation (turn) of the rotary disk 7 and the revolution of the power generation motors 8 through the window 15, the window 35, and the casings 29, 30 with the cooling windows. The air flow is also guided by the wind-collecting blade 34 and gathered at the contact point between the slip ring 18 and the brush 19 in order to cool the frictional heat and electric resistance heat when electric power is passed at the contact point, thereby reducing a loss caused by increased resistance as temperature rises. Note that air is taken in through openings at the front and back of a gate-shaped form with the slip ring posts 14 and the spring support bar 26, and the air that has absorbed heat is discharged to the outside through an upper opening surface of the cylindrical body 12, the window 15, and the like. In this way, electrically and mechanically heat generating parts are forcibly cooled by airflow to keep the thermal loss low.

As in this embodiment, if the power generation motor 8 is configured as a motor having a permanent magnet and a coil, the motor (electric motor) can be used as a power generator, and as a result, the rotary-driven power generation device 40 can be assembled simply and inexpensively.

In addition, if the deformed portion 71 is formed on the rotary disk 7, the elastic deformation of the rotary disk 7 can be easily obtained so that the deformation of the outer peripheral portion of the rotary disk 7 can be reliably performed by the required amount. Moreover, if the spring 16 and the nut 17 are interposed at the position where the rotary disk 7 is attached to the central rotational shaft 4, the pressing force (contact pressure) of the wheel 10 against the wheel-running track 11 can be adjusted according to the degree of tightening of the nut 17 so that the degree of displacement of the outer peripheral portion of the rotary disk 7 can be easily adjusted to a target value.

If the wheel 10 is configured to be of a conical shape with required mass (weight), and a circumferential surface 37 of a bottom face of the cone serves as a contact surface for the wheel-running track 11, the stable inertial rotation of the wheel 10 ensures constant rotation of the power generation motor shaft 9 and reduces fluctuations in power generation capacity.

If the drive motor 1 and the power generation motors 8 have the casings 29, 30 with cooling windows, and the cylindrical body 12 and the rotational-shaft-holding structure 13 have the cooling window 15, 35, the swirling air flow caused by the rotation of the rotary disk 7 and the revolution of the power generation motors 8 is expected to provide effective air-cooling effect, thereby reducing heat generation in heated portions and improving power generation efficiency.

Moreover, since the wind-collecting blade 34 is provided as a part of the unit of the slip ring 18 and the brush 19, when the rotation (turn) of the rotary disk 7 and the revolution of the power generation motors 8 cause the air flow in the direction of the rotation and the revolution, the air flow is guided by the wind-collecting blade 34 and gathered at the contact point between the slip ring 18 and the brush 19, thereby cooling the heat generated at the contact point and reducing a loss caused by increased electric resistance.

Note that, although the wheel 10 and the wheel-running track 11 are in frictional contact by the pressing force between the cylindrical surface of the wheel 10 and the plane of the wheel-running track 11, the contact surface between the two can be made as a grooved friction wheel (a V-shaped concave and convex surfaces) in order to improve the rotation transmission capacity.

Figure 5:
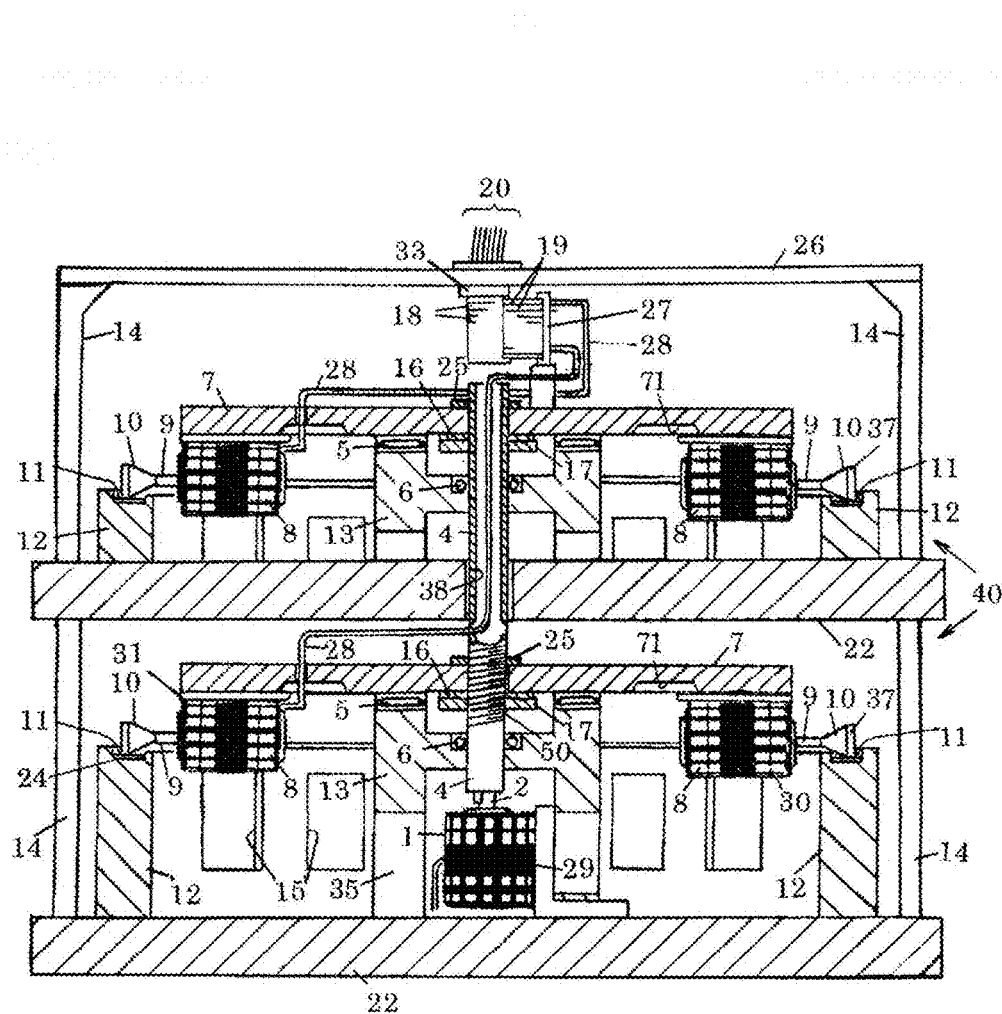
FIG. 5 is a vertical cross-sectional view of the rotary-driven power generation device (40) of the present invention with a two-stage structure as an example of a multiple-stage structure of the rotary disk (7) and a plurality of power generation motors (8).

Next, FIG. 5 shows an example of rotary-driven power generation devices 40 assembled in a two-stage stacked configuration, taking into consideration applications in a narrow installation space. In this configuration example, the drive motor 1 and the central rotational shaft 4 are common to the upper and lower rotary-driven power generation devices 40, and the central rotational shaft 4 forms, from its middle, an output line hole 38 for passing the power generation motor output line 28 of the lower rotary-driven power generation device 40. In this configuration example, the drive motor 1 has characteristics suitable for driving the two-stage rotary-driven power generation devices 40.

In FIG. 5, the upper rotary-driven power generation device 40 is a unique with a relatively low height in order to make it thinner, but it may also be composed as the same part as a part of the lower rotary-driven power generation device 40. The slip ring 18 and the brush 19 are common to the upper and lower devices, but they may also be provided separately for each. Moreover, the central rotational shaft 4 may also be separate into upper and lower parts and detachably combined by a shaft-connecting means such as splines or serrations. In addition, the drive motor 1 may also be provided for each of the two-stage rotary-driven power generation devices 40.

Figure 6:
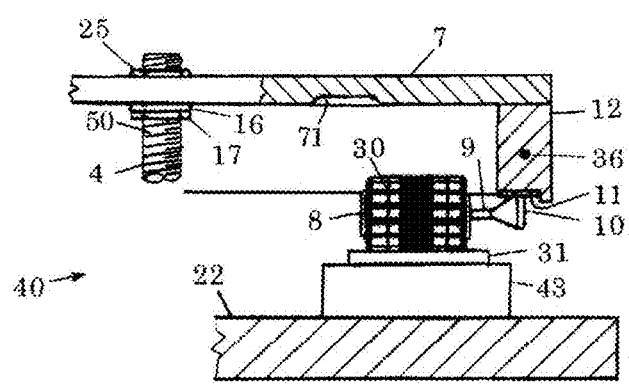
FIG. 6 is a cross-sectional view of a part of an example of the rotary-driven power generation device (40) of the present invention in which the power generation motors (8) are attached to a bottom plate (22) on a fixed side.

FIG. 6 shows an example in which the motor-holding plate 31 and a power-generation-motor-holding base 43 are used for attaching the nine power generation motors 8 to the bottom plate 22 on the fixed side, the cylindrical body 12 is attached to the rotary disk 7 on the rotating side, and the wheel-running track 11 on the lower surface of the cylindrical body 12 is brought into frictional contact with the wheel 10. The wheel-running track 11 on the cylindrical body 12 belongs to the rotating side together with the rotary disk 7, and the nine power generation motors 8 belong to the fixed side by being attached to the bottom plate 22 and thus do not serve as loads for the rotation (turn) of the rotary disk 7. Therefore, the driving force required for the drive motor 1 can be made as small as possible. In this configuration example, as in FIGS. 1 and 4, the rotary disk 7 is deformed into a dish shape by the centrifugal force acting on the center of gravity 36 and thus the wheel-running track 11 is moved away from the wheel 10 during the steady rotation, so that the pressing force between the two becomes weaker than at start-up to the extent that the wheel-running track 11 is about to but not completely separate from the wheel 10.

Figure 7:
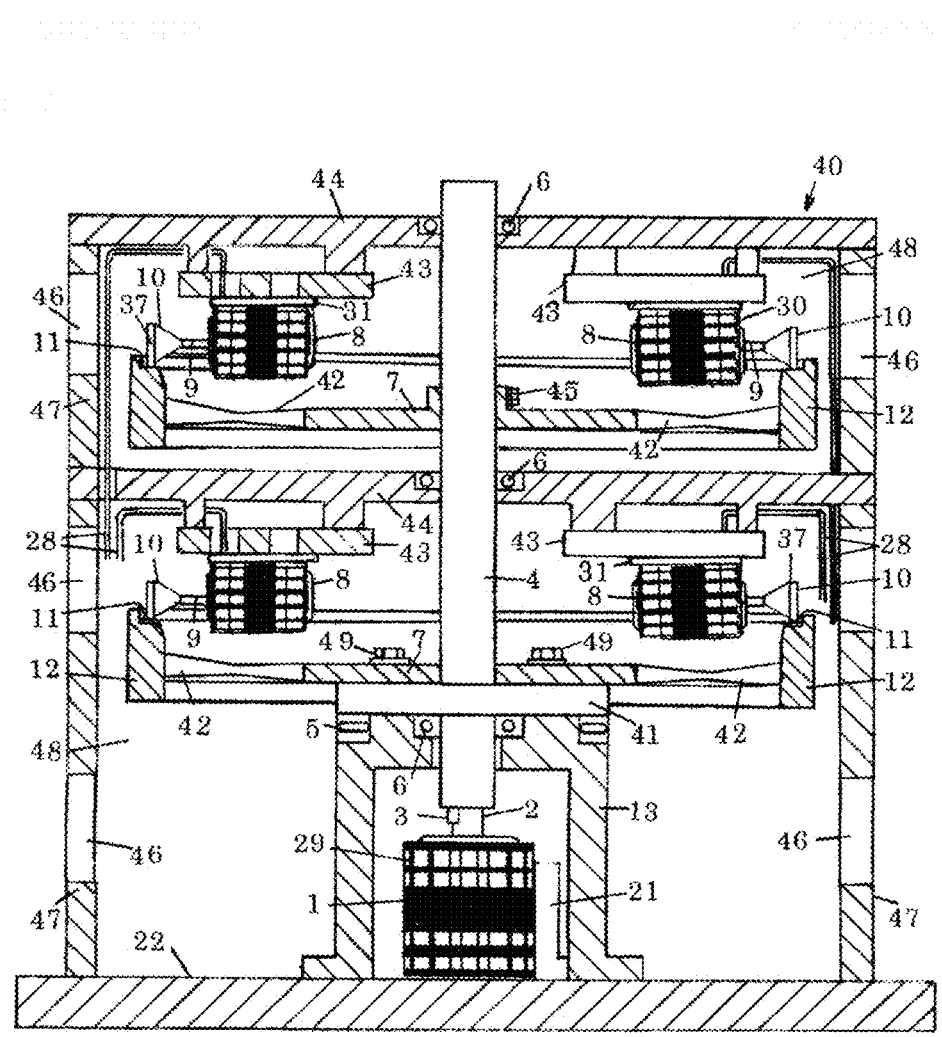
FIG. 7 is a vertical cross-sectional view of a multiple-stage (two-stage) structure of the rotary disk (7) and a plurality of power generation motors (8) on the fixed side in another rotary-driven power generation device (40) of the present invention.
Figure 8:
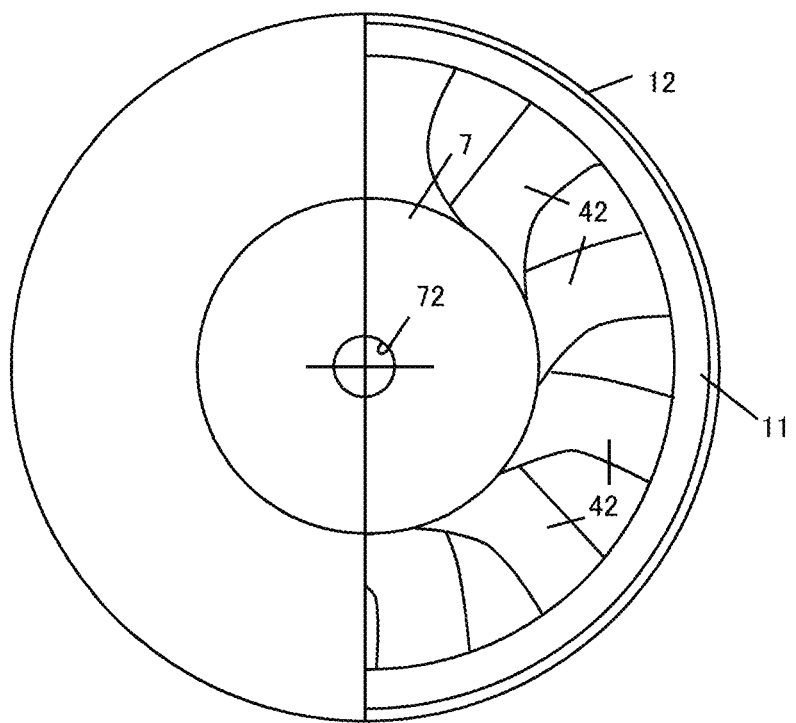
FIG. 8 is a partial plan view of the rotary disk (7) and the fan blades (42) in the rotary-driven power generation device (40) shown in FIG. 6.

FIGS. 7 and 8 show an example assembled with the same main part as in the configuration in FIG. 5, in which: taking into consideration applications in a narrow installation space as in FIG. 5, the rotary-driven power generation devices 40 are assembled in a two-stage stacked configuration; a part of the rotary disk 7 forms fan blades 42; the nine power generation motors 8 are attached to the power-generation-motor-holding disk 44 as a fixed-side member by using the motor-holding disk 31 and the power-generation-motor-holding base 43; and the wheel 10 on the power generation motor shaft 9 is brought into friction contact with the wheel-running track 11 on the outer periphery of the rotary disk 7.

In the configuration example in FIGS. 7 and 8, the central rotational shaft 4 is a shaft common to the upper and lower device, and is rotatably supported by a thrust roller bearing 5 and a ball bearing 6 on the rotational-shaft-holding structure 13, as well as ball bearings 6 on the upper and lower power-generation-motor-holding disks 44. The upper rotary disk 7 is fixed at the predetermined point on the central rotational shaft 4 by a fixing bolt 45, and the lower rotary disk 7 rests on a flange 41 of the lower part of the central rotational shaft 4 and attached to the central rotational shaft 4 by several fixing bolts 49.

The rotary disk 7 is molded from a material with appropriate strength such as molded aluminum alloy, the fan blades 42 are formed as one member or individual members between its central area and its outer peripheral area, and the cylindrical body 12 on the outer periphery integrally forms the wheel-running track 11 on its upper surface. The direction of the air blown by the fan blades 42 is directed toward the direction of the power generation motors 8, and the rotation direction of the central rotational shaft 4 is set correspondingly. The wheel-running track 11 has the weight required for the flywheel effect at the raised part of the rotary disk 7 and obtains a moment of rotational inertia during rotation to reduce the rotational load of the drive motor 1. Note that since the power-generation-motor-holding disk 44 and outer-peripheral towers 47, each with a window 46, form a gate-shaped structure, the front and back thereof are open and serve as air intakes 48 from the outside.

Since the power generation motor 8 is attached to the power-generation-motor-holding disk 44 as a fixed-side member, the power generation motor output lines 28 do not require a unit of a slip ring and a brush (slip ring 18, brush 19, and wind-collecting blade 34) and are directly connected to an external load and the like. Note that, the "fixed-side member" refers to the bottom plate 22 as well as members that are connected to the bottom plate 22 or that are not displaced relative to the bottom plate 22, and includes the power-generation-motor-holding disk 44, the outer-peripheral tower 47, and the like in this example.

When a user starts the drive motor 1, the rotary disk 7 rotates and the wheel 10 on the power generation motor shaft 9 frictionally rolls along the wheel-running track 11, and the power generation motor 8 starts to generate electric power. At this time, the rotary disk 7 generates a sufficient friction force between the wheel-running track 11 and the wheel 10 to rotate the power generation motor shaft 9 of the power generation motor 8 by a predetermined pressing force obtained by the strength of its material. During steady rotation after the start-up, the rotary disk 7 continues inertial rotation, so output of the drive motor 1 can be reduced by the inertial rotation and operation with lower power consumption can be achieved.

In addition, when the rotary disk 7 rotates, the rotary disk 7 stirs the surrounding air as it rotates, thereby cooling the power generation motor 8. In particular, the fan blades 42 actively take in outside air from the air intake 48 and the like and send cooling air in a direction of the power generation motor 8 and to portions that electrically or frictionally generate heat in order to absorb heat from each part and discharge hot air to the outside through the window 46 and the like, thereby forcibly cooling the heated portions of the power generation motor 8 including a permanent magnet, reducing electrical or frictional heat generation, and improving the power generation efficiency.

As described above, since the power generation motor 8 does not need a unit of a slip ring and a brush (slip ring 18, brush 19, and wind-collecting blade 34) and directly outputs electric power to the outside. It has mechanically and electrically stable output characteristics compared to those with the unit of the slip ring and the brush and does not need maintenance and inspection. In addition, since a plurality of power generation motors 8 are on the power-generation-motor-holding disk 44 which is a fixed-side member, and they are not driven by the drive motor 1, the rotational force required by the drive motor 1 can be smaller than in the example in FIG. 1, which allows for labor savings.

Moreover, the rotary disk 7 in FIG. 7 is fixed to the central rotational shaft 4 by a bolt, but if an appropriate spring is interposed between the central rotational shaft 4 and the rotary disk 7 as shown in FIGS. 1 and 5, the pressing force of the wheel-running track 11 against the wheel 10 can be increased or decreased for adjusting it to the required value.

The configuration example shown in FIGS. 7 and 8 does not assume that the pressing force of the wheel-running track 11 against the wheel 10 is varied at steady state. However, if necessary, the pressing force of the wheel-running track 11 against the wheel 10 can be adjusted in the same manner as in the example shown in FIG. 1 by making the fan blades 42 from an elastically-deformable material with appropriate strength and elastically deforming the wheel-running track 11 integrated with the fan blades 42 so that it is about to separate from the wheel 10 due to the reaction generated in the fan blades 42 when air is blown. Moreover, the pressing force can also be adjusted in the same manner as in the example shown in FIG. 1 at steady state by moving the center of gravity of the cylindrical body 12 closer to the wheel-running track 11. Therefore, when necessary, the pressing force of the wheel 10 against the wheel-running track 11 can be embodied as necessary by the reaction generated in the fan blades 42 when air is blown, the centrifugal force acting on the center-of-gravity position, or the combined action of the reaction and the centrifugal force.

INDUSTRIAL APPLICABILITY

In this embodiments, the drive motor 1 is used as a rotational drive source. However, this rotational drive source can be replaced with a prime mover that can be used in emergencies such as a small or medium sized water turbine (a propeller water turbine or a Kaplan water turbine using water pressure from a water supply or a high-rise roof top tank) and a prime mover such as a gasoline engine, or a rotating body (rotary-driven body) that rotates in conjunction with the prime mover. The rotation of them adjusts reduction ratio or speed-up ratio during transmission of the rotational force according to transmission ratio of a belt pulley, a gear train, or the like, and can be adopted to the rotational drive source with target high torque and low rotation speed specification as the required rotation speed and the required torque. Therefore, the rotary-driven power generation device 40 according to the present invention is also effective as an emergency power generation device in the event of a disaster.

In the present invention, the rotary-driven power generation device 40 is not limited to the illustrated two-stage configuration, but can be assembled into a multi-stage configuration having two or more stages in order to increase the number of the power generation motors 8 and obtain a predetermined electric power.

REFERENCE SIGNS LIST

1 Drive Motor As Rotational Drive Source
2 Drive Motor Shaft
3 Key
4 Central Rotational Shaft
5 Thrust Roller Bearing
6 Ball Bearing
7 Rotary Disk
71 Deformed Portion
72 Mounting Hole
8 Power Generation Motor (Power Generator)
9 Power Generation Motor Shaft
10 Wheel
11 Wheel-Running Track
12 Cylindrical Body
13 Rotational-Shaft-Holding Structure
14 Slip Ring Post
15 Window
16 Spring
17 Nut
18 Slip Ring
19 Brush
20 Output Line
21 Drive Motor Holding Plate
22 Bottom Plate
23 Drive Motor Input Line
24 Friction Material
25 Nut
26 Slip Ring Support Bar
27 Brush Support
28 Power Generation Motor Output Line
29 Casing With Cooling Window
30 Casing With Cooling Window
31 Motor-Holding Plate
32 Through Hole
33 Slip Ring Base
34 Wind-Collecting Blade
35 Window
36 Center Of Gravity
37 Circumferential Surface
38 Output Line Hole
39 Power Source
40 Rotary-Driven Power Generation Device
41 Flange
42 Fan Blade
43 Power-Generation-Motor-Holding Base
44 Power-Generation-Motor-Holding Disk
45 Bolt
46 Window
47 Outer-Peripheral Tower
48 Air Intake
49 Bolt
50 Female Screw

The invention claimed is:

1. A rotary-driven power generation device configured by:
   connecting a rotational drive source with high torque and low rotation speed specification to a vertical central rotational shaft;
   attaching a plurality of power generation motors to an elastically deformable rotary disk attached orthogonal to the central rotational shaft at equal intervals relative to a center of the rotary disk and with power generation motor shafts directed to a radial direction;
   bringing a wheel fixed on a tip of the power generation motor shaft into frictional contact with an annular wheel-running track on a cylindrical body concentrically fixed to the central rotational shaft; and
   connecting a power generation motor output line of each of the power generation motors to an output line via a unit of a slip ring and a brush, wherein:
   when starting the rotational drive source, rotational force required to start the power generation motors is ensured by the frictional contact of the wheel with respect to the wheel-running track based on weight of the power generation motors; and
   during steady rotation after starting the rotational drive source, driving force of the rotational drive source is reduced by rotational inertia of the rotary disk and the power generation motors while the rotary disk is deformed into a dish shape by centrifugal force acting on a center of gravity below the power generation motor in order to reduce contact friction resistance caused by the wheel, the wheel-running track, and pressing force, which are about to separate from each other, and to reduce a load on the rotational drive source, so that multiple electric power is efficiently and independently output from the respective power generation motors, and the electric power is supplied to outside through the output line by electrical contact between the slip ring and the brush.

2. The rotary-driven power generation device according to claim 1, wherein the rotational drive source is constituted by a drive motor or a prime mover.

3. The rotary-driven power generation device according to claim 1, wherein the rotary-driven power generation devices are stacked and assembled in a multi-stage configuration.

4. The rotary-driven power generation device according to claim 1, wherein each of the power generation motors is composed of a motor basically constructed of a permanent magnet and a coil.

5. The rotary-driven power generation device according to claim 1, wherein a thin deformed portion is formed at a middle position in the radial direction of the rotary disk so that the rotary disk can be easily deformed upward.

6. The rotary-driven power generation device according to claim 1, wherein a spring and a nut are interposed at a position where the central rotation shaft is attached to the rotary disk so that a contact pressure of the wheel against the wheel-running track according to a degree of tightening the nut.

7. The rotary-driven power generation device according to claim 1, wherein the wheel is conical, and a large-diameter circumferential surface serves as a contact surface for the wheel-running track.

8. The rotary-driven power generation device according to claim 1, wherein the drive motor and the power generation motors are a casing with a cooling window, the cooling window is formed on the cylindrical body, and a wind-collecting blade directed toward a contact point between the slip ring and the brush is incorporated as a part of the unit.

9. A rotary-driven power generation device configured by:
   connecting a rotational drive source with high torque and low rotation speed specification to a vertical central rotational shaft;
   providing a cylindrical body, which is concentrically fixed to the central rotating shaft, on an elastically deformable rotary disk attached orthogonal to the central rotational shaft;
   attaching a plurality of power generation motors to a low plate at equal intervals relative to a center of the rotary disk and with power generation motor shafts directed to a radial direction; and
   bringing a wheel fixed on a tip of the power generation motor shaft into contact with an annular wheel-running track on a cylindrical body, wherein:
   when starting the rotational drive source, rotational force required to start the power generation motors is ensured by the frictional contact of the wheel with respect to the wheel-running track; and
   during steady rotation after starting the rotational drive source, driving force of the rotational drive source is reduced by rotational inertia of the rotary disk while the rotary disk is deformed into a dish shape by centrifugal force acting on a center of gravity of the rotary disk in order to reduce contact friction resistance caused by the wheel, the wheel-running track, and pressing force, which are about to separate from each other, and to reduce a load on the rotational drive source, so that multiple electric power is efficiently and independently output from the respective power generation motors.

10. The rotary-driven power generation device according to claim 9, wherein the rotational drive source is constituted by a drive motor or a prime mover.

11. The rotary-driven power generation device according to claim 9, wherein the rotary-driven power generation devices are stacked and assembled in a multi-stage configuration.

12. The rotary-driven power generation device according to claim 9, wherein each of the power generation motors is composed of a motor basically constructed of a permanent magnet and a coil.

13. The rotary-driven power generation device according to claim 9, wherein a thin deformed portion is formed at a middle position in the radial direction of the rotary disk so that the rotary disk can be easily deformed upward.

14. The rotary-driven power generation device according to claim 9, wherein a spring and a nut are interposed at a position where the central rotation shaft is attached to the rotary disk so that a contact pressure of the wheel against the wheel-running track according to a degree of tightening the nut.

15. The rotary-driven power generation device according to claim 9, wherein the wheel is conical, and a large-diameter circumferential surface serves as a contact surface for the wheel-running track.

16. A rotary-driven power generation device configured by:
   connecting a rotational drive source with high torque and low rotation speed specification to a vertical central rotational shaft;
   forming an annular fan blade between a central area and an outer peripheral area of a rotary disk attached orthogonal to the central rotational shaft,
   providing an annular wheel-running track on an outer periphery of the rotary disk so that the wheel-running track is concentric with the central rotational shaft,
   attaching a plurality of power generation motors to fixed-side members at equal intervals relative to a center of the rotary disk and with power generation motor shafts directed to a radial direction; and
   bringing a wheel fixed on a tip of the power generation motor shaft into frictional contact with the wheel-running track, wherein:
   during rotation of the rotary disk after starting the rotational drive source, driving force of the rotational drive source is reduced by rotational inertia of the rotary disk and multiple electric power is efficiently and independently output from power generation motor output lines of the respective power generation motors while forcibly cooling heated portions by air blown by the fan blade as the rotary disk rotates.

17. The rotary-driven power generation device according to claim 16, wherein the rotational drive source is constituted by a drive motor or a prime mover.

18. The rotary-driven power generation device according to a claim 16, wherein the rotary-driven power generation devices are stacked and assembled in a multi-stage configuration.

19. The rotary-driven power generation device according to claim 16, wherein each of the power generation motors is composed of a motor basically constructed of a permanent magnet and a coil.

20. The rotary-driven power generation device according to claim 16, wherein the wheel is conical, and a large-diameter circumferential surface serves as a contact surface for the wheel-running track.

21. The rotary-driven power generation device according to claim 16, wherein, during the steady rotation after starting the rotational drive source, pressing force of the wheel-running track against the wheel is reduced by centrifugal force acting on the cylindrical body of the rotary disk in order to reduce a load on the rotational drive source.

22. The rotary-driven power generation device according to claim 16, wherein, during the steady rotation after starting the rotational drive source, pressing force of the wheel-running track against the wheel is reduced by reaction acting on the fan blade of the rotary disk in order to reduce a load on the rotational drive source.

* * * * *